(No Model.) 2 Sheets—Sheet 1.

A. J. HOAG.
REVERSING GEAR FOR STEAM ENGINES.

No. 244,807. Patented July 26, 1881.

Witnesses
Franck L. Ourand
W. E. Chaffee

Inventor
Andrew J. Hoag
by A. M. Smith & Co.
Attorneys (No Model.) 2 Sheets—Sheet 2.

A. J. HOAG.
REVERSING GEAR FOR STEAM ENGINES.

No. 244,807. Patented July 26, 1881.

Witnesses,
Franck L. Ourand
W. O. Chaffu

Inventor,
Andrew J. Hoag,
by A. M. Smith & Co.
Attorneys

UNITED STATES PATENT OFFICE.

ANDREW J. HOAG, OF BATTLE CREEK, MICHIGAN, ASSIGNOR TO NICHOLS, SHEPARD & CO., OF SAME PLACE.

REVERSING-GEAR FOR STEAM-ENGINES.

SPECIFICATION forming part of Letters Patent No. 244,807, dated July 26, 1881.

Application filed June 9, 1881. (No model.)

*To all whom it may concern:*

Be it known that I, ANDREW J. HOAG, of Battle Creek, county of Calhoun, State of Michigan, have invented certain new and useful Improvements in Reversing-Gear for Steam-Engines, of which the following is a full and exact description, reference being had to the accompanying drawings, making part of this specification, in which—

Figure 1:
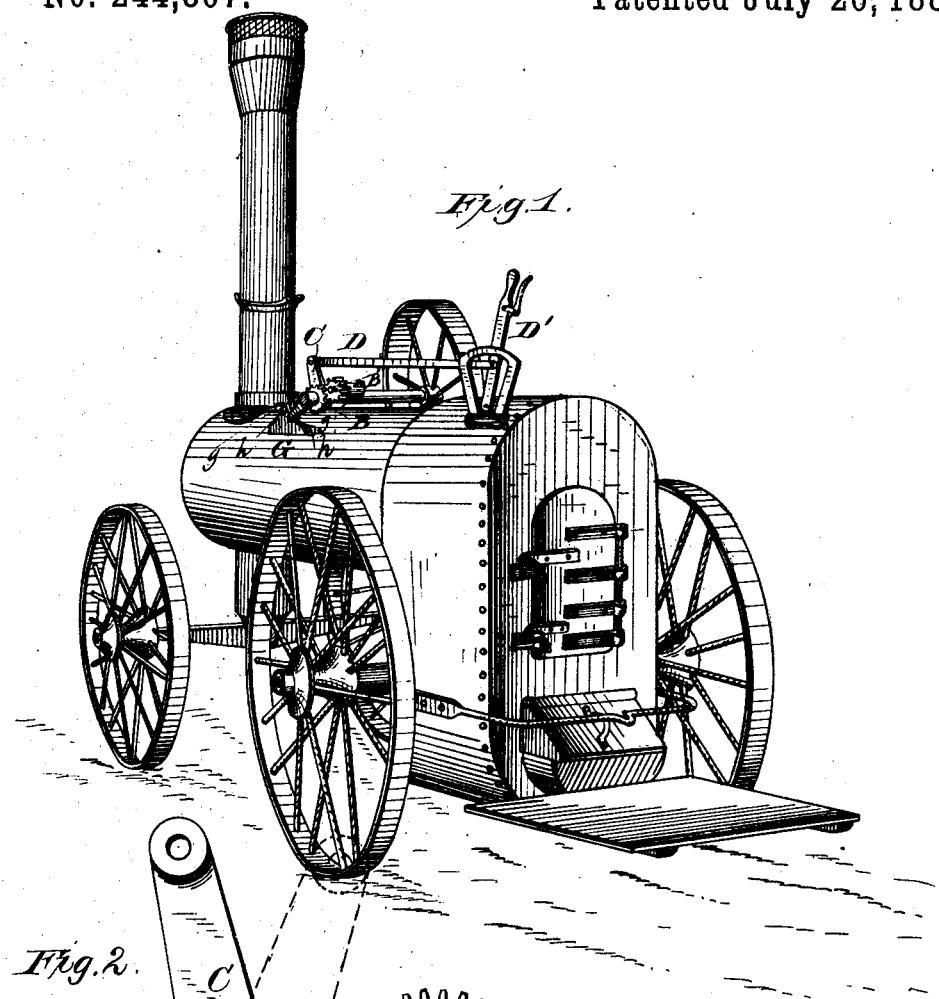
Figures 2, 4:
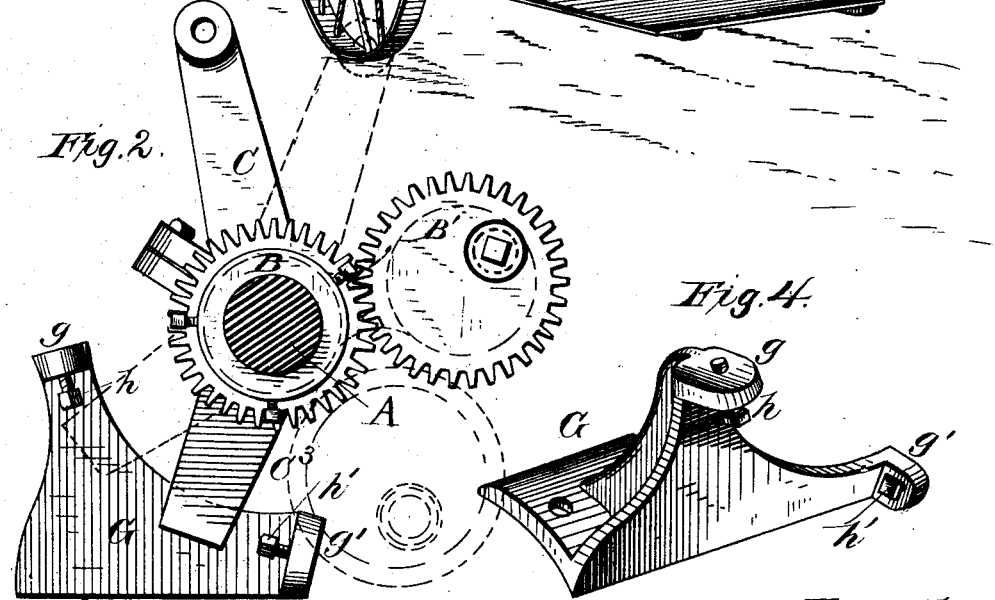
Figure 3:
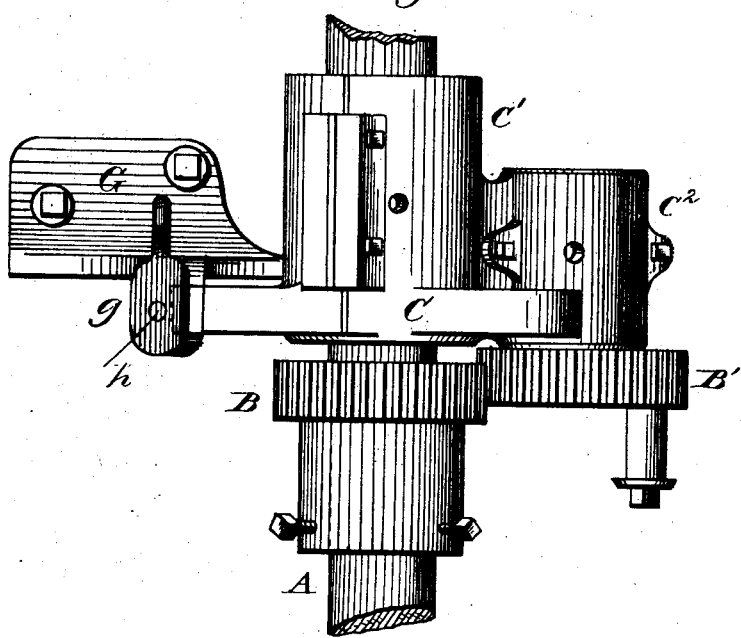

Figure 1 is a perspective view of so much of a traction-engine as is necessary to show my improvement applied. Fig. 2 is a side elevation, showing the main engine-shaft in section with the reversing gear and lever in working relation to the adjustable stops. Fig. 3 is a plan or top view of the same, and Fig. 4 is a perspective view of the stop-plate detached.

My invention relates to a novel arrangement of reversing-gear and its actuating-lever in connection with adjustable stops for regulating with precision the throw of the reversing-lever and the amount of lead to be given to the steam, as hereinafter explained.

The engine in its organization and arrangement of parts may be similar to those now in use, and it need not, therefore, be described, in detail, further than is necessary to an understanding of my improvements.

The form of reversing-gear shown is similar to that described in Letters Patent granted to Elon A. Marsh, December 28, 1880, No. 236,052, consisting of two gears of equal diameter—one mounted upon the main engine-shaft and rotating therewith, and the other gearing therewith upon a short parallel shaft upon an arm of a lever adjustable upon the main engine-shaft as a center, the last-named gear carrying the crank-pin to which the valve-rod is connected. My improvement thereon will be best understood from the following description with reference to the drawings, in which—

A represents the main engine-shaft, and B a spur-gear mounted thereon and keyed or otherwise secured to said shaft, so as to rotate with it.

C is a lever-plate journaled upon the shaft A by means of a sleeve, C', surrounding said shaft, and provided with an arm, C², the outer end of which has a suitable bearing for a short shaft, carrying a second spur-gear, B', or upon which said gear is mounted. The gear B' is of the same diameter as gear B, and engaging with and being actuated by said gear, is consequently rotated in the same time, at the same rate of speed, as the gear B, but in the reverse direction. The lever-plate has a rod, D, connected with it, which extends rearward to and is connected with a lever, D', arranged within convenient reach of the attendant, said lever engaging by means of a thumb-latch with a rack-segment for holding it at any desired adjustment. The elasticity of this rod D has been found to render it unreliable in determining the adjustment of the gear B' relative to the gear B, and the amount of lead given with the precision required; and to obviate this difficulty I provide the lever-plate C with a pendent third arm, C³, formed in one piece with said plate, and moving between adjustable stops in a plate or bracket, G, secured to the boiler or other suitable point of support underneath the shaft A, as shown. This plate or bracket is curved on its upper face, or has arms projecting upward from it provided at their upper or outer ends with laterally-projecting spurs or ears $g\ g'$, in which the adjustable stops are secured, said stops consisting in the present instance of headed screws $h\ h'$, by the adjustment of which the throw of the arm C³ and of the lever-plate C, of which it forms a part, is determined with entire precision, and is not left dependent upon the degree of rigidity of the connecting-rod referred to. By the adjustment of the stops $h\ h'$ the throw of the lever-plate and of the valve rod crank-wrist connected therewith may be varied for regulating or adjusting the the lead, as desired.

The operation of the gear in reversing the engine is the same as that described in the Marsh patent referred to, and therefore need not be here described.

Having now described my invention, I claim—

The combination, with the valve-rod and the lever carrying the crank-wrist, of the rod and lever for actuating said lever, and the arm and adjustable stops for regulating its throw, substantially as and for the purpose described.

ANDREW J. HOAG.

Witnesses:
FRANK W. DUNNING,
GEO. F. BARROW.